United States Patent
Hirayama et al.

(10) Patent No.: US 9,775,333 B2
(45) Date of Patent: Oct. 3, 2017

(54) FISHING REEL

(71) Applicant: Shimano Inc., Sakai-ku, Sakai, Osaka (JP)

(72) Inventors: Hirokazu Hirayama, Sakai (JP); Hirokazu Hiraoka, Sakai (JP)

(73) Assignee: SHIMANO INC., Sakai (JP)

( * ) Notice: Subject to any disclaimer, the term of this patent is extended or adjusted under 35 U.S.C. 154(b) by 267 days.

(21) Appl. No.: 14/716,825

(22) Filed: May 19, 2015

(65) Prior Publication Data

US 2016/0113261 A1  Apr. 28, 2016

(30) Foreign Application Priority Data

Oct. 27, 2014  (JP) .................................. 2014-218073

(51) Int. Cl.
*A01K 89/01* (2006.01)

(52) U.S. Cl.
CPC ...... *A01K 89/011221* (2015.05); *A01K 89/01* (2013.01); *A01K 89/0106* (2015.05); *A01K 89/0117* (2013.01)

(58) Field of Classification Search
CPC .................. A01K 89/01; A01K 89/011221
See application file for complete search history.

(56) References Cited

U.S. PATENT DOCUMENTS

2011/0174909 A1* 7/2011 Shibata .................. A01K 89/01
                                                       242/230
2012/0048981 A1* 3/2012 Ohara ................ A01K 89/0108
                                                       242/230
2015/0373961 A1* 12/2015 Horie ..................... A01K 89/01
                                                       242/234
(Continued)

FOREIGN PATENT DOCUMENTS

EP         1205106       5/2002
JP      2010-187566 A    9/2010
(Continued)

OTHER PUBLICATIONS

EP15180889.6 Extended European Search Report dated Mar. 14, 2016.

*Primary Examiner* — Emmanuel M Marcelo
(74) *Attorney, Agent, or Firm* — Jeffer Mangels; Butler & Mitchell LLP; Brennan C. Swain, Esq.

(57) ABSTRACT

This invention is characterized by a reel body, a pinion gear that is supported by the rotation function of the reel body, a one-way clutch that is fitted to the pinion gear and that limits the rotation of the pinion gear to one direction, a rotor that is fitted to the pinion gear and rotates with it while also containing a boss section, a part of which is connected to the pinion gear and extends to the one-way clutch, a magnetic body that is formed and makes a circuit around the periphery of the rotation direction of the boss section, a magnet that is configured facing the rotational radius direction with a gap in the magnetic body, with the magnet that faces the rotational radius direction with a gap in the magnetic body being sandwiched between the magnetic plates in a direction facing the spool shaft, and the magnetic sealing mechanism wherein is found magnetic fluid that is placed in the gap between the magnetic plates and the magnetic body, and whereby the space between the cover member and the magnetic body is sealed.

12 Claims, 3 Drawing Sheets

(56) References Cited

U.S. PATENT DOCUMENTS

2016/0113261 A1* 4/2016 Hirayama ...... A01K 89/011221
242/319

FOREIGN PATENT DOCUMENTS

| JP | 2011-155944 A | 8/2011 |
|----|---------------|--------|
| JP | 2011-167186 A | 9/2011 |
| JP | 2012-16361 A | 1/2012 |
| JP | 2012-19752 A | 2/2012 |
| JP | 2012-23965 A | 2/2012 |

* cited by examiner

FISHING REEL

FIELD OF THE INVENTION

This invention concerns a fishing reel comprising a one-way clutch and the sealing mechanism thereof.

BACKGROUND OF THE INVENTION

With regard to the fishing reel, a drive unit is installed with a sealing mechanism to both prevent the drive unit placed within a housing unit that itself is formed in the reel from being invaded by such substances water and to make sure that the driving function is always stable, even in environments where inundation by such things as water can easily occur. It is a fishing reel that utilizes a magnetic seal as the sealing mechanism, as known from, for example, Japanese Published Unexamined Application No. 2010-187566 (the "'566 application") and Japanese Published Unexamined Application No. 2011-167186 (the "'186 application"), the entireties of which are incorporated by reference in their entireties.

With regard to the fishing reel of the '566 application, a magnetic circuit is formed between the space of the opening of the accommodating recess that houses the drive member rotated during the operation of the handle and the drive member itself, with the opening being sealed by the current maintained within this space. With regard to the fishing reel of the '186 application, a sealing mechanism is formed between the drive member that rotates with the rotor and the supporting unit that supports said drive member.

The magnetic sealing mechanism is formed by a magnet, the cylindrical magnetic body that is fitted between the drive member or the drive unit and that forms the magnetic circuit between the magnet, and the magnetic fluid maintained between the magnet and magnetic material. It is proposed in both the '566 application and the '186 application that the inner ring of the one-way clutch be elongated and serve as the cylindrical magnetic body.

When a cylindrical magnetic body that comprises the magnetic seal is fitted to a drive unit, such as a pinion gear, the manufacturing process becomes troublesome when, for example, a fitting part needs to be formed for fitting to the outer periphery of a pinion gear. When the cylindrical magnetic body is combined with the inner ring of the one-way clutch, the inner ring must be made into a specialized shape, meaning that not only is the general-purpose, one-way clutch unusable due to high costs, the rotation (movement) of the roller of the one-way clutch is affected by the magnetization of the inner ring, thereby affecting the function of the one-way clutch, with these just being some of the problems.

This invention was created to solve these problems, wherein the purpose of the magnetic seal configuration of the fishing reel is to make sure that the functionality of the one-way clutch is not negatively affected, and to ensure the stability of waterproofing performance with easy assembly.

SUMMARY OF THE PREFERRED EMBODIMENTS

In accordance with a first aspect of the present invention there is provided a fishing reel that includes a reel body, a rotating member (a pinion gear) extending through the reel body, a one-way clutch that is fitted to the rotating member and a rotor that is fitted to and rotates with the rotating member and includes a cylindrical portion, a front wall, a boss section that is connected to the rotating member, and defines a housing space therein. The reel also includes a magnetic seal assembly positioned in the housing space between the front wall of the rotor and the one-way clutch. The magnetic seal assembly includes a magnet sandwiched between first and second magnetic plates. The reel also includes a magnetic body disposed between the spool shaft and the magnetic seal assembly, wherein a gap is defined between the magnetic body and the magnetic seal assembly, and a magnetic fluid is disposed in the gap between the magnetic seal assembly and the magnetic body. The magnetic fluid seals the gap.

In a preferred embodiment, the fishing reel also includes a cover that has a cylindrical portion and a front portion having a front surface and a central opening extending axially therethrough. The cover defines a housing space therein. The one-way clutch is housed in the housing space of the cover, and the magnetic seal assembly is secured to the front surface of the cover. Preferably, the front portion of the cover includes an annular recess defined therein, and at least the magnet and the second magnetic plate are positioned in the recess. In a preferred embodiment, the first magnetic plate has a diameter that is greater than the diameter of the second magnetic plate, and the (rear surface of the) first magnetic plate is secured to the front surface of the cover. Therefore, the first magnetic plate is not positioned in the recess with the magnet and the second magnetic plate.

In a preferred embodiment, the magnetic body is an annular member fitted to the boss section of the reel. Preferably, the magnetic body includes a cylindrical portion and a disc-shaped portion. The cylindrical portion is disposed between the boss section and the magnetic fluid (on the outer diameter of the boss section), and the disc-shaped portion is fitted to the spool shaft (and to the rear surface of the boss section). In another embodiment, the boss section comprises the magnetic body.

In accordance with another aspect of the present invention there is provided a fishing reel that includes a reel body, rotating member (a pinion gear) supported by the reel body, a one-way clutch prohibits the rotation of the rotating member to one direction and that is fitted to the rotating member, a rotor that is fitted to the rotating member and rotates with the rotating member and includes a boss section, a connecting part connects to the rotating member and extends to the one-way clutch, a magnetic body is configured to form on outer periphery of the boss section, a magnet sandwiched between magnetic plates in a direction along rotating member, and a magnetic fluid. The magnet and magnetic plates are configured facing the rotation radius direction and form a gap with the magnetic body, and the magnetic fluid is placed in the gap between the magnetic plates and the magnetic body. The gap between the magnetic plates and the magnetic body is sealed by the magnetic fluid.

The magnetic body would ideally be made of an annular material fitted to the boss section. Or, the boss section of the drive body could be formed from a magnetic material, thereby combining the boss section with the magnetic body.

This invention does not hinder the performance of the one-way clutch, is easy to assemble and maintains a stable waterproofing performance.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

It will be appreciated that terms such as "front," "back," "top," "bottom," "side," "short," "long," "up," "down," "left," "right" and "below" used herein are merely for ease of description and refer to the orientation of the components as shown in the figures. It should be understood that any orientation of the components described herein is within the scope of the present invention.

Figure 1:
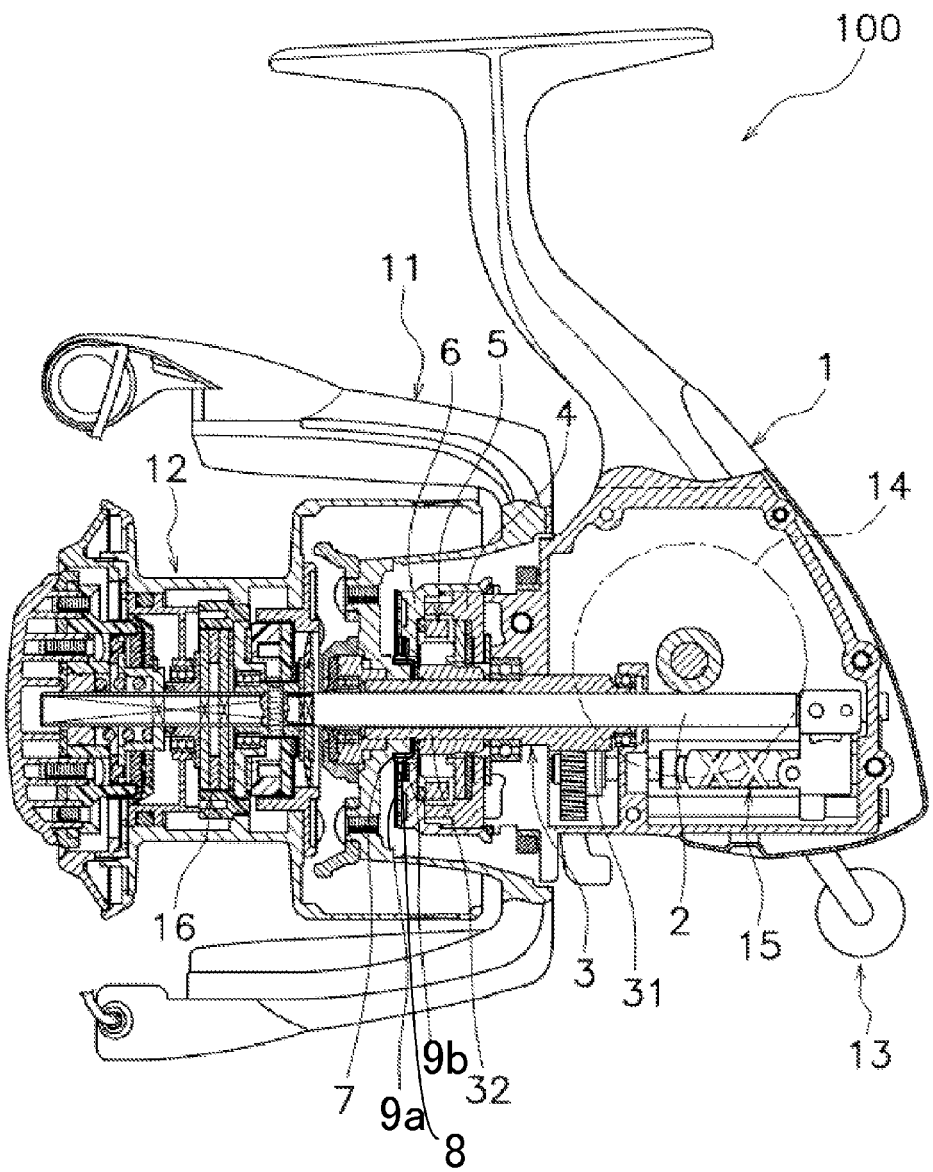
FIG. 1 is a sectional view of a fishing reel in accordance with a preferred embodiment of the present invention.

FIG. 1 is a sectional view of the fishing reel in connection with an embodiment of the invention, wherein the spinning reel 100 is a fishing reel. Spinning reel 100, as shown in FIG. 1, goes to the left towards the tip of the fishing rod (the front), to which it can be attached. The reel comprises a reel body 1, a rotor 11, a spool 12 and a handle 13. The fishing line (not illustrated) that wraps around the spool is casted out to the front, or in other words, towards the left of FIG. 1.

Rotor 11, by rotating the crank that is handle 13, is able to rotate about an axis that extends to the front and back, or, based on the image, to the left and right. When handle 13 is turned, spool 12 moves in reciprocation with the simultaneous rotation of rotor 11, the fishing line is guided by rotor 11, wound equally on cylindrical surface of spool 12.

Rotor 11 is fixed to an attachment 32 of a pinion gear 3, rotates with pinion gear 3. Pinion gear 3 is rotatably supported by the rotation function of reel body 1. Pinion gear 3 is a hollow cylinder through which a spool shaft 2 is configured to penetrate. Both spool shaft 2 and pinion gear 3 rotate relative to each other and move in reciprocation. Spool 12 is configured at the tip of spool shaft 2 via a drag mechanism 16, while the end of spool shaft 2 is connected to an oscillating mechanism 15.

Handle 13 turns into a crank, with a drive gear 14 attached to the crank shaft. Drive gear 14 is, as an example, a bevel gear that is meshed with gear part 31 of pinion gear 3. An oscillating mechanism 15 rotates in synch with pinion gear 3. When oscillating gear 15 rotates, it causes spool shaft 2 to move in a back and forth direction in response. The end of spool shaft 2, the side with a part 31 of pinion gear 3, drive gear 14 and oscillating mechanism 15 are housed within the reel body.

A one-way clutch 5 is configured between pinion gear 3 and a housing member 4 so that pinion gear 3 will only rotate in one direction. Housing member 4 is firmly fixed to reel body 1. The inner ring of one-way clutch 5 is fixed to pinion gear 3 and rotates with pinion gear 3. The outer ring of one-way clutch 5 is fitted and fixed to housing member 4.

One-way clutch 5 is, as an example, a roller-like one-way clutch, with the roller one-way clutch comprising an outer, an inner ring, rollers and springs. The inner circumference of the outer ring or the periphery of the inner ring have cam faces on thereon, with the rollers configured to face cam faces, being maintained so that, by way of springs, either the cam surfaces of the outer ring are connected to the outer circumference of the inner ring or the inner ring cam surfaces are connected to the inner circumference of the outer ring. The contact pressure between the cam surfaces and rollers increase when the inner ring rotates in a direction towards the outer ring, whereas when resistance occurs, the inner rings are not rotating toward the outer ring. When the inner ring is rotating in the opposite direction, the contact surface pressure between the cam surfaces and the rollers decrease, the rollers are idle, and the inner ring rotates towards the outer ring. As a result, the pinion gear can only rotate in one direction.

One-way clutch 5 is kept in housing member 4 using a cover 6. Cover 6 covers the front surface of housing member 4, excluding pinion gear 3 and a boss section 113 of the rotor 11 which is fitted to pinion gear 3. Cover 6 is set so as not to make contact with the boss section 113.

So that the space between cover 6 and the boss section of rotor 11 can be sealed, a magnetic sealing mechanism is configured to include both an annular magnet 8 and magnetic plates 9a and 9b. Additionally, a magnetic body 7 is annularly formed and extends around the periphery of the rotation direction of the boss section. Facing magnetic body 7, magnet 8 and magnetic plates 9a and 9b is a gap. A magnetic circuit is formed between magnet 8, magnetic plate 9a and 9b and magnetic body 7. Magnetic fluid 10 is maintained between both magnetic body 7 and magnetic plate 9a and 9b, with the space between cover material 6 and magnetic body 7 (boss section) being sealed.

Figure 2:
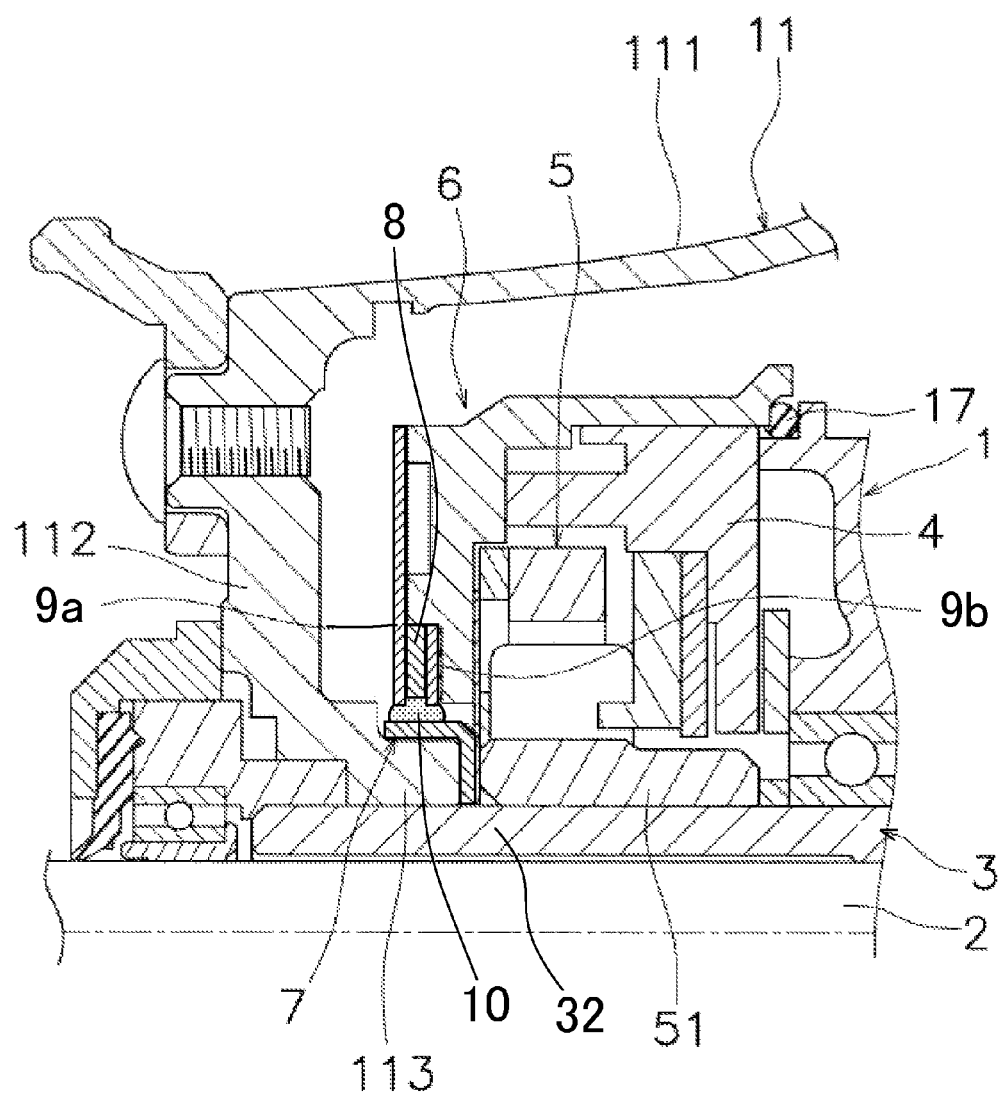
FIG. 2 is a sectional view of the magnetic sealing mechanism part.

FIG. 2 is a sectional view of the sealing mechanism part connected to this embodiment, wherein only one side with respect to the centerline of spool shaft 2 is shown.

Rotor 11 is formed by a cylinder 111, a wall 112 and a boss section 113. These are unitedly formed as one member. Cylinder 111 is a cylindrical material, wherein is formed the housing space. Wall 112 is formed into a circular plate and possesses an opening in the center. The outer circumference of wall 112 is connected to the inner circumference of cylinder 111. Boss section 113 extends from the edges of the inner circumference of wall 112 to the one-way clutch. Boss section 113 is fitted and fixed to attachment 32 of pinion gear 3, and rotor 11 rotates with pinion gear 3.

Housing member 4 is fixed into place by a screw, for example, to the front of reel body 1 so as not to have it rotate towards reel body 1. One-way clutch 5 is housed within housing member 4. Cover 6 is an annular part comprised of a cylinder covering the outer circumference of housing member 4 and the lid covering the front surface of housing member 4. Cover 6 keeps the one-way clutch in the inner cavity of housing member 4 with the lid, and is fixed to the reel body using, for example, a screw. An annular ring 17 is interposed between the edge of the cover 6 cylinder and the reel body, with the inner circumference surface of cover 6 and the outer circumference of magnetic body 7 facing each other at intervals.

Magnetic body 7 is formed into an annular shape and makes a circuit around the outer periphery of the rotation direction of boss section 113. As seen in FIG. 2, magnetic body 7 includes an annular part attached to the periphery of pinion gear 3. Magnetic body 7 is fitted to the pinion gear at its inner circumference, with the surface of the periphery of magnetic body 7 being defined by the fitting of magnetic body 7 to pinion gear 3.

Magnet 8 is configured facing a rotation radius direction with a gap in the magnetic body. Magnet 8 is formed into an annular shape, and in addition, magnetic plates 9a and 9b are also configured facing the rotation circumference direction with a gap in magnetic body 7. Both magnetic plates 9a and 9b are configured facing the rotational radius direction with a gap in magnetic body 7, are annularly shaped and face the periphery of the rotation radius direction of magnetic body 7, and both magnetic plate 9a and 9b have placed between them in the direction of the spool shaft one magnet 8. Magnet plate 9b and magnet 8 are fitted to a recess formed on the side of the inner circumference belonging to the front surface of cover 6, with cover 6 being a support part that supports both magnetic plate 9a and 9b.

A gap exists between the inner circumference of both magnet 8 and magnetic plate 9a and magnetic body 7 and magnetic plate 9b, with a magnetic fluid 10 being configured in that gap. Magnet 8, magnetic plates 9a and 9b and magnetic fluid 10 comprise the magnetic sealing mechanism.

Magnet 8, magnetic plates 9a and 9b and magnetic body 7 form a magnetic circuit. Magnetic fluid 10 is a substance wherein ferromagnetic particles with a particle diameter of several nm are stably dispersed into hydrocarbon oil or fluorine oil based solvent using a surfactant. Due to the magnetization of the part facing the magnet 8 of magnetic body 7 and magnetic members 9a and 9b, magnetic fluid 10 is maintained within the area surrounded by magnet 8, magnetic members 9a and 9b and magnetic body 7. The gap between magnet 8, magnetic members 9a and 9b and magnetic body 7 is sealed by magnetic fluid 10, preventing any contaminants for making their way into the side with one-way clutch 5 via the housing space of cylinder 111. This magnetic sealing mechanism has properties that are highly sealant with respect to gas bodies due to the liquid around magnetic body 7. Additionally, dust does not form there because there is no physical contact at the sealing portion. Furthermore, because there is no solid sliding in the sealing portion, there is very little torque loss and the rotation performance is not easily compromised.

The magnetic field lines of magnet 8 are attracted to and go through magnetic plates 9a and 9b as well as magnetic body 7, and because of this, the magnetic flux of magnet 8 will not leak into one-way clutch 5. Thus, inner ring 51 of one-way clutch 5 will not be magnetized, nor will the operation of one-way clutch 5 be affected by magnet 8. As a result, and based on this embodiment, the performance of one-way clutch 5 will not be compromised, assembly is easy, and a stable waterproofing performance can be maintained.

Magnet body 7 is not limited to the form as shown in FIG. 2. For example, the magnetic body can be formed on the cylindrical member that does not have an annular part attached to pinion gear 3, and can be fitted to boss section 113.

Figure 3:
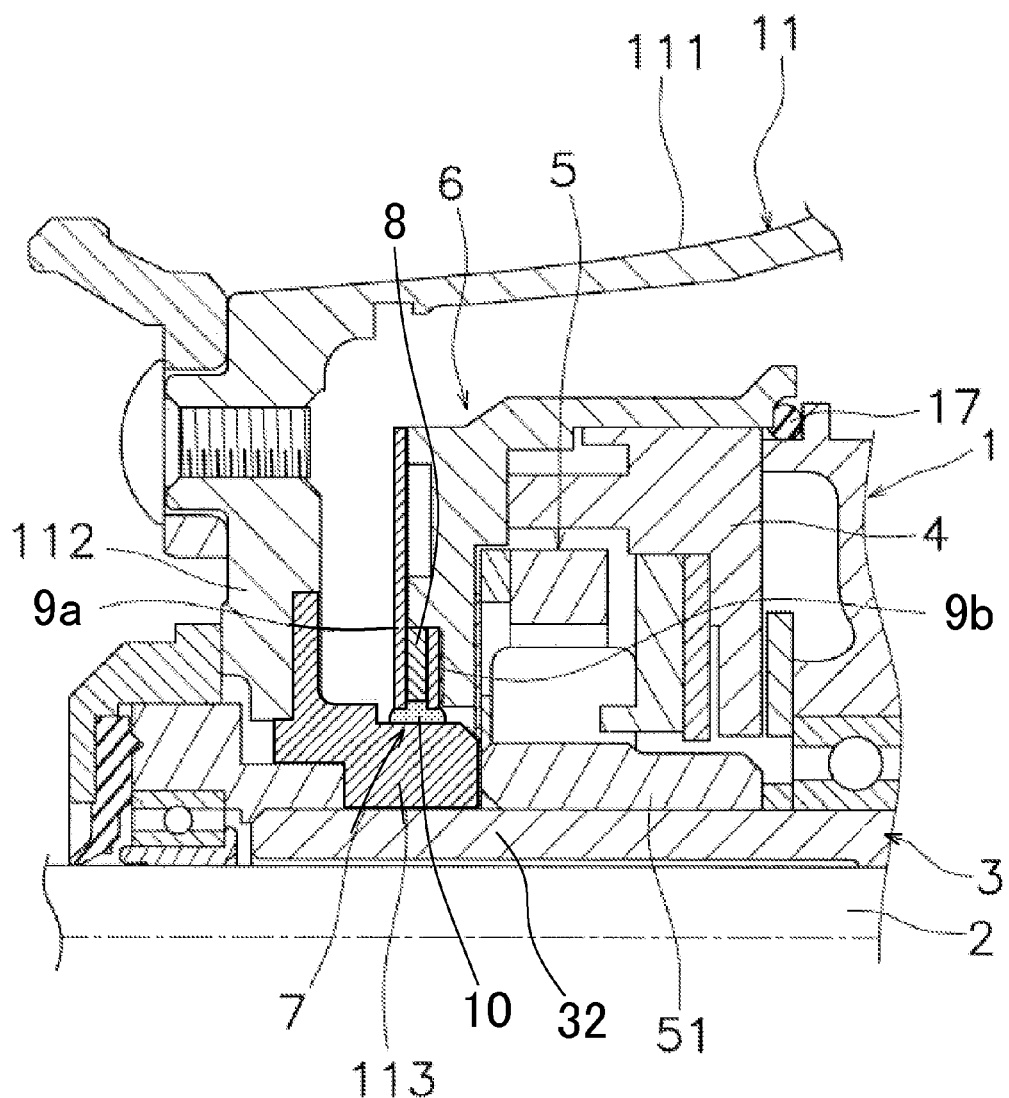
FIG. 3 is a sectional view of the magnetic sealing mechanism part in accordance with another embodiment of the present invention.

FIG. 3 is a sectional drawing of the magnetic sealing mechanism part in connection with a modified embodiment, wherein boss section 113 is formed from a magnetic material, and where the magnetic body 7 and boss section 113 are formed into one. Rotor 11 is formed with cylinder 111 and wall 112 combined together, with boss section 113 being formed by other elements. The inner circumference part of wall 112 is fixed to boss section 113 and configures rotor 11. Wall 112 is fixed to boss section 113 using such things as enhanced press-fitting, caulking, adhesive, or screws. The other configurations are the same as those in FIG. 2.

In the modification example, the magnetic field lines are drawn to magnetic plates 9a and 9b as well as to the boss section and travels through them, and because of this, the magnetic flux of magnet 8 will not leak into one-way clutch 5. Thus, inner ring 51 of one-way clutch 5 will not be magnetized, nor will the operation of one-way clutch 5 be affected by magnet 8. As a result, the modification has it where the performance of one-way clutch 5 is not hindered and a stable, waterproof performance can be maintained with easy assembly.

In the modification example, the periphery surface of magnetic body 7 (boss section 113) facing magnet 8 as well as magnetic plates 9a and 9b is precisely configured by the fitting of boss section 113 to pinion gear 3, and because of this, the precision of the gap between magnetic plates 9a and 9b is increased. As a result, the sealing performance of the magnetic seal mechanism is strengthened.

In the embodiment, while an explanation is given regarding the configuration wherein the one-way clutch 5, which is fitted to pinion gear 3 that drives rotor 11 of spinning reel 100, is sealed by a magnetic sealing mechanism, the magnetic sealing of the one-way clutch for the fishing reel is not limited to this example. A configuration of the embodiment is also applicable to a magnetic sealing mechanism whereby the one-way clutch is sealed from the side with the rotating body.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A fishing reel comprising:
    a reel body,
    a rotating member rotatably supported and extending through the reel body,
    a one-way clutch fitted to the rotating member,
    a rotor connecting and rotating with the rotating member, wherein the rotor includes a cylindrical portion, a front wall and a boss section that is connected to a pinion gear, wherein the rotor defines a housing space therein,
    a magnetic seal assembly disposed in the housing space between the front wall of the rotor and the one-way clutch, wherein the magnetic seal assembly includes a magnet sandwiched between first and second magnetic plates,
    a magnetic body disposed between the rotating member and the magnetic seal assembly, wherein a gap is defined between the magnetic body and the magnetic seal assembly, wherein the magnetic body is an annular member fitted to the boss section, wherein the magnetic body includes a cylindrical portion and a disc-shaped portion, wherein the cylindrical portion is positioned between the boss section and the magnetic fluid, and wherein the disc-shaped portion is fitted to the rotating member, and
    a magnetic fluid disposed in the gap between the magnetic seal assembly and the magnetic body, whereby the magnetic fluid seals the gap.

2. The fishing reel of claim 1 further comprising a cover that includes a cylindrical portion and a front portion having a front surface and a central opening extending axially therethrough, wherein the cover defines a housing space therein, wherein the one-way clutch is housed in the housing space, and wherein the magnetic seal assembly is secured to the front surface of the cover.

3. The fishing reel of claim 2 wherein the front portion of the cover includes an annular recess defined therein, and wherein at least the magnet and the second magnetic plate are positioned in the recess.

4. The fishing reel of claim 3 wherein the first magnetic plate has a diameter that is greater than a diameter of the second magnetic plate, and wherein the first magnetic plate is secured to the front surface of the cover.

5. The fishing reel of claim 4 wherein the first magnetic plate is not positioned in the recess.

6. The fishing reel of claim 1 wherein the rotating member comprises a pinion.

7. The fishing reel of claim 1 wherein the one-way clutch includes an inner ring, and wherein the magnetic body is separate from the inner ring.

8. The fishing reel of claim 1 wherein the one-way clutch includes an inner ring, and wherein the disc shaped portion of the magnetic body is positioned between the inner ring and the boss section.

9. A fishing reel comprising:
    a reel body,
    a rotating member rotatably supported by the reel body,
    a one-way clutch prohibiting the rotation of the rotating member in one direction and that is fitted to the rotating member,
    a rotor connecting and rotating with the rotating member, wherein the rotor includes a boss section, a connecting part connected to the rotating member and extending to the one-way clutch,
    a magnetic body that forms an outer periphery of the boss section, wherein the magnetic body is an annular member fitted to the boss section, wherein the magnetic body includes a cylindrical portion and a disc-shaped portion, wherein the cylindrical portion is positioned between the boss section and the magnetic fluid, and wherein the disc-shaped portion is fitted to the rotating member,
    a magnet sandwiched between magnetic plates in a direction along the rotating member, wherein the magnet and magnetic plates are configured facing the rotation radius direction and form a gap with the magnetic body, and
    a magnetic fluid disposed in the gap between the magnetic plates and the magnetic body, whereby the gap between the magnetic plates and the magnetic body is sealed.

10. The fishing reel of claim 9 wherein the rotating member comprises a pinion.

11. The fishing reel of claim 9 wherein the one-way clutch includes an inner ring, and wherein the magnetic body is separate from the inner ring.

12. The fishing reel of claim 9 wherein the one-way clutch includes an inner ring, and wherein the disc shaped portion of the magnetic body is positioned between the inner ring and the boss section.

* * * * *